(12) United States Patent
Strepka et al.

(10) Patent No.: US 7,872,063 B2
(45) Date of Patent: Jan. 18, 2011

(54) FILM FORMING COMPOSITIONS CONTAINING MIXTURES OF BENZOIC ACID ESTERS

(75) Inventors: Arron Strepka, LaGrange Park, IL (US); Makarand V. Joshi, Grayslake, IL (US); William D. Arendt, Libertyville, IL (US); Jason Butt, Oak Park, IL (US)

(73) Assignee: Genovique Specialties Holdings Corporation, Kingsport, TN (US)

( * ) Notice: Subject to any disclaimer, the term of this patent is extended or adjusted under 35 U.S.C. 154(b) by 241 days.

(21) Appl. No.: 11/534,456

(22) Filed: Sep. 22, 2006

(65) Prior Publication Data

US 2008/0076861 A1 Mar. 27, 2008

(51) Int. Cl.
*C08K 5/10* (2006.01)
*C08K 5/105* (2006.01)
*C08K 5/103* (2006.01)
*C08K 5/101* (2006.01)
*C08L 33/08* (2006.01)
*C08L 33/10* (2006.01)
*C09G 1/16* (2006.01)

(52) U.S. Cl. .................. 524/284; 524/287; 524/292; 524/293; 524/299; 524/315; 524/317; 524/560; 524/543; 524/306; 524/556; 106/3; 106/11; 106/287.26

(58) Field of Classification Search .................. 524/291, 524/292, 287, 765, 293, 299, 315, 317, 560, 524/543, 306, 556, 284; 106/3, 31.13, 11, 106/287.26
See application file for complete search history.

(56) References Cited

U.S. PATENT DOCUMENTS

| | | | | |
|---|---|---|---|---|
| 5,676,742 | A | * 10/1997 | Arendt et al. | ............ 106/15.05 |
| 6,201,056 | B1 | 3/2001 | Zhu | |
| 6,583,207 | B2 | * 6/2003 | Stanhope et al. | ............ 524/291 |
| 6,689,830 | B1 | 2/2004 | Arendt et al. | |
| 7,056,966 | B2 | 6/2006 | Stanhope et al. | |

* cited by examiner

*Primary Examiner*—Mark Eashoo
*Assistant Examiner*—Michael Pepitone
(74) *Attorney, Agent, or Firm*—Brett L Nelson; Bernard J. Graves, Jr.

(57) ABSTRACT

This invention provides film-forming compositions, including but not limited to polishes, coatings, adhesives and inks, comprising a at least one acrylic or vinyl acetate polymer or copolymer as a film-forming ingredient and, as the plasticizer, a blend in specified proportions of a) the benzoate of a 6-carbon monohydric alcohol, b) diethylene glycol dibenzoate and c) diethylene glycol monobenzoate.

24 Claims, No Drawings

FILM FORMING COMPOSITIONS CONTAINING MIXTURES OF BENZOIC ACID ESTERS

This invention relates to plasticized film-forming compositions More particularly, this invention relates to film-forming compositions containing an organic polymer as the film-forming material and, as the plasticizer, a mixture of three esters of benzoic acid in specified proportions. These esters impart a set of desirable properties to film-forming compositions, particularly those employed as floor polishes. The relative concentrations of the three benzoic acid esters are critical to obtaining the desired properties in the final film.

BACKGROUND

Esters derived from benzoic acid and mono- and dihydric alcohols containing from 2 to 20 or more carbon atoms are known as plasticizers for a variety of both crosslinked and non-crosslinked organic polymers, including homopolymers and copolymers of esters derived from ethylenically unsaturated acids such as acrylic and methacrylic acids and homo- and copolymers of vinyl acetatel. The alcohol portion of these esters typically contains from 1 to 10 or more carbon atoms. These polymers can optionally include repeating units derived from ethylenically unsaturated hydrocarbons such as ethylene and styrene.

U.S. Pat. No. 5,236,987 to William Arendt, which issued on Aug. 17, 1993, teaches using certain esters of benzoic acid as coalescents and plasticizing agents for water-based paint compositions containing an emulsified acrylic polymer as the film-forming material. The alcohol portion of the benzoic acid ester contains from 8 to 12 carbon atoms and the polymer is typically present in the composition as an aqueous emulsion.

The major ingredients of the paints described in the Arendt patent typically comprise a water borne film-forming polymer derived from at least one ester of acrylic and/or methacrylic acid, water, a pigment, a thickening agent and at least one surfactant. The combination of pigment and thickening agent typically constitutes from 20 to 50 percent by weight of the total paint composition.

Film-forming compositions such as inks, adhesives and floor polishes contain different ingredients and types of film forming polymers than paints. Even though the polymers in these compositions are prepared from the same class of monomers as those present in paints, the type(s) of monomer(s), the molecular weight of the polymer, and the presence and interaction of the additional ingredients present in the various types of compositions make it difficult to predict how a coalescent, leveling agent and/or plasticizer suitable for use paint compositions will affect the properties of other film-forming compositions, such as adhesives and polish formulations, and the properties of the resultant films.

European Patent No. 668,338 issued to Rohm and Haas describes adhesive compositions wherein the film-forming material is an acrylic polymer. In addition to the polymer the compositions also include from 0.1 to 40 parts by weight per 100 parts of polymer of a plasticizer. Suitable plasticizers include benzoic acid esters derived from diethylene glycol and/or dipropylene glycol. No benzoate esters derived from aliphatic alcohols are disclosed.

Classes of compounds disclosed as being effective coalescing, leveling, and/or plasticizing agents for compositions containing polymerized ethylenically unsaturated esters as the film-forming polymer include but are not limited to organic esters such as dioctyl adipate and 2,2,4-trimethyl-1,4-pentanediol mono- and diisobutyrates, esters of phthalic acid wherein the alcohol portion of the ester typically contains from 3 to 10 carbon atoms, partially etherified diols and triols such as 2-(2-ethoxyethoxy)ethanol, and trialkoxyalkyl phosphates such as tributoxyethyl phosphate. Some of these materials, particularly esters derived from aliphatic carboxylic acids such as adipic acid, do not substantially improve either the film-forming properties of aqueous polymer compositions typically used as adhesives, inks, floor polishes and unpigmented coatings, or the appearance of films formed from these compositions.

U.S. Pat. No. 6,989,830, which issued to William D. Arendt et al. on Feb. 10, 2004 describes film-forming compositions, including floor polishes, containing 1) at least one acrylic, vinyl acetate or epoxide polymer or copolymer as a film-forming ingredient and 2) an ester derived from benzoic acid and a monohydric alcohol containing 8 carbon atoms. The alcohol is preferably 2-ethylhexanol. These benzoic acid esters are disclosed as unique with respect to their ability to improve the properties of many types of film-forming compositions, including adhesives, floor polishes and non-pigmented epoxy coatings. Additional advantages are obtained when the aforementioned benzoic acid ester is used in combination with the benzoic acid ester of diethylene glycol and/or triethylene glycol.

The data in Example 1 of this patent demonstrate that the leveling and gloss exhibited following six coatings of a floor polish containing the combination of 50 weight percent of 2-ethylhexyl benzoate 33 weight percent of diethylene glycol dibenzoate and 17 weight percent of triethylene glycol dibenzoate was superior to these properties exhibited following six coatings of a polish containing a quantity of 2-ethylhexyl benzoate equal to the weight of the combination of benzoates and none of the glycol esters. When rated for hardness, a film applied using the polish composition containing only the 2-ethylehexyl benzoate was superior.

The present invention is based on the discovery that the leveling of aqueous film-forming compositions, particularly the type employed as polishes for a variety of substrates, including but not limited to including wood, stone and both filled and unfilled organic polymers, together with the gloss, hardness, recoatability and resistance to both soiling and water spotting of the solidified film are maximized using the combination of benzoic acid esters of this invention. The compositions are particularly useful as floor polishes on a variety of flooring materials.

SUMMARY

The present invention provides film-forming compositions wherein films applied using said composition exhibit a unique combination of properties including but not limited to hardness, leveling, high gloss, and recoatability in combination with resistance to soiling and spotting by water, and wherein said compositions include:

A) at least one polymer selected from the group that includes
  (1) homopolymers and copolymers of esters of acrylic and methacrylic acids;
  (2) said copolymers wherein a portion of the repeating units are derived from at least one acid selected from the group consisting of acrylic and methacrylic acids;
  (3) copolymers of styrene and at least one member selected from the group consisting of esters of acrylic and methacrylic acids; and
  (4) homopolymers and copolymers of vinyl acetate; and B) a mixture of benzoic acid esters in an amount effective for optimizing film properties in a film formed from said film-forming composition, the mixture of benzoic acid esters including:

(1) from about 15 to about 20 weight percent, based on the total weight of the mixture of benzoic acid esters, of an ester represented by the formula $PhCO(O)R^1$, where Ph represents a phenyl radical and $R^1$ represents a linear or branched alkyl radical containing 8 carbon atoms, (2) from about 60 to about 65 weight percent, based on the total weight of the mixture of benzoic acid esters, of diethylene glycol dibenzoate, and (3) from about 20 to about 25 weight percent, based on the total weight of the mixture of benzoic acid esters, of diethylene glycol monobenzoate.

In an important aspect, $R^1$ is a 2-ethylhexyl. The mixture of benzoic acid esters may include about 17 weight percent of $PhCO(O)R^1$, about 62 weight percent diethylene glycol dibenzoate, and about 21 weight percent diethylene glycol monobenzoate. The mixture of benzoic acid esters is from about 0.1 to about 40 weight percent of the film forming composition, based on the total weight of the film forming composition. The polymer may be provided in aqueous medium and the aqueous medium may be about 10 to about 95 weight percent of the film forming composition, based on the total weight of the film forming composition. The film forming composition may be a liquid at 25° C.

The polymer used in the film forming composition may include aliphatic, cycloaliphatic and aromatic diepoxide. The film forming composition may further include crosslinking agents. Examples of crosslinking agents include aliphatic amines, cycloaliphatic amines, aromatic amines, carboxylic acid and mixtures thereof.

In another important aspect, a polish is provided which is effective for use as a polish on surfaces, especially flooring surfaces, derived from wood, stone and vinyl polymers. The polish has a combination of polymers and benzoic acid esters that are effective for providing optimal film properties. The polish includes a polymer and a mixture of benzoic acid esters. The polymer may include (1) homopolymers and copolymers of esters of acrylic and methacrylic acids; (2) copolymers wherein a portion of the repeating units are derived from at least one acid selected from the group consisting of acrylic and methacrylic acids, and (3) copolymers of styrene and at least one member selected from the group consisting of esters of acrylic and methacrylic acids. The mixture of benzoic acid esters includes (1) from about 15 to about 20 weight percent of an ester based on the formula $PhCO(O)R^1$, wherein Ph is a phenyl radical and $R^1$ is a linear or branded alkyl radical containing 8 carbon atoms; (2) from about 60 to about 65 weight percent diethylene glycol dibenzoate, and (3) from about 20 to about 25 weight percent diethylene glycol monobenzoate (where all percentages are based in the total weight of the mixture of benzoic acid esters).

In another aspect, a method is provided for making a film forming composition. The method includes blending a polymer with a mixture of benzoic acid esters.

DETAILED DESCRIPTION

The film-forming compositions of this invention include but are not limited to water-borne polishes, adhesives, inks and coatings.

Polishes containing the plasticizer blends of this invention can be applied as polishes to surfaces of stone, wood, filled and unfilled organic polymers, and coated metal.

Preferred embodiments of the present compositions are polishes for protecting and beautifying flooring surfaces formed of wood, stone, organic polymer films and metals coated with a film of an organic polymer. The polishes are aqueous formulations comprising a film-forming acrylic polymer and one of the present benzoate plasticizer compositions. The present combination of benzoic acid esters replaces the function of phosphoric acid esters of prior art compositions as leveling agents in addition to acting as a plasticizer for the film-forming polymer.

The present compositions are particularly useful as floor polishes for a variety of substrates, including stone, wood and vinyl-coated composites.

When used in the amounts specified in the preceding paragraph the three esters interact to provide the combination of hardness, leveling, gloss, recoatability, and resistance to soiling and water spotting to films formed from polymer compositions containing these plasticizers. The accompanying example demonstrates that this combination of properties is unique to the present blends of benzoic acid esters and cannot be achieved using prior art blends of glycol benzoates with benzoates of 8-carbon monohydric alcohols, including those disclosed in the aforementioned U.S. Pat. No. 6,689,830. As used herein, "optimizing or optimal film properties" refers to a film having a hardness of at least about 40 seconds, preferably about 60 to about 130 seconds as determined by ASTM D4366 over glass, a 20° gloss of at least about 10, preferably about 40 to about 80, resistance to soiling resulting in a minimum change in color, preferably about 10 to about 25 ΔE units, the ability to be recoated without an indication of discoloration of the previous coat or the dragging of the applicator, a resistance to spotting by water of displaying no signs of discoloration, swelling of degradation of the film and the ability to level during application and drying with minimal indication of the applicator streaking, preferably no indication.

A conventional floor polish typically contains the following ingredients:

an aqueous emulsion of a) a homopolymer or copolymer derived from at least one ester of acrylic or methacrylic acid wherein the alcohol portion of the ester contains from 1 to 8 carbon atoms or b) a copolymer derived from at least one of these esters and up to 20 weight percent, based on total repeating units in said polymer, of styrene;

a glycol ether such as diethylene glycol monomethyl ether as a coalescing agent;

and 3) from 2 to about 5 weight percent, based on total polish weight, of a leveling aid that is typically an ester of phosphoric acid such as tributoxyethyl phosphate.

Optional ingredients include solubilized resins such as a rosin-based resin; and aqueous emulsions of organic waxes such as polyethylene waxes.

In addition to the repeating units derived from the aforementioned esters, the film-forming polymer may also contain a small concentration, typically less than about 5 weight percent, of units derived from acrylic and\or methacrylic acid as a solubilizing aid.

Relatively minor amounts of additional ingredients, including but not limited to defoamers, wetting agents, biocides and auxiliary plasticizers can also be present. Isodecyl benzoate is an example of a auxiliary plasticizer typically used in polish compositions for floors.

The present inventors discovered that the present benzoic acid ester compositions can replace three of the ingredients typically present in floor polish compositions, namely the phosphate esters conventionally used as the leveling agent; 2) the aromatic and aliphatic acid esters such as isodecyl benzoate typically used as auxiliary plasticizers; and 3) the esters typically used as coalescing agents. The film formed when the resultant formulation is applied to the polyvinyl chloride wear layer of a flooring material exhibits the all of the aforementioned desirable properties and is at least comparable to the phosphate-containing control.

The combination of desirable properties that characterize the present floor polishes can only be achieved when the three benzoic acid esters are used in the following relative concentrations by weight:

Benzoate of 8-carbon monocarboxylic acid—15-20%

Diethylene Glycol Dibenzoate—60-65%

Diethylene Glycol Monobenzoate—20-25%.

The properties imparted by 2-ethylhexyl benzoate (2-EHB), a preferred benzoic acid ester of an 8-carbon monohydric alcohol, are optimized when this ester is used in combination with diethylene glycol dibenzoate (DEGDB) and diethylene glycol monobenzoate (DEGMB) in the aforementioned proportions.

The present floor polishes may further include compound selected from the group consisting of emulsified polyolefin wax, a coalescent for the polymer, a rosin-based resin, a benzoic acid leveling agent and mixtures thereof. In this aspect, the concentration of aqueous polymer dispersion is from about 10 to about 70 weight percent, the emulsified polyolefin wax concentration is about 1 to about 30 weight percent, the coalescent concentration is from about 1 to about 10 weight percent, the rosin-based resin concentration is about 1 to about 10 weight percent and the composition further includes from about 30 to about 80 weight percent water. The coalescent used in the polish may include esterified glycols and the polyolefin wax may be a polyethylene wax.

In another aspect, the polish may include less than one weight percent of at least one additive selected from the group consisting of biocidal agents, wetting agents, defoamers and mixtures thereof. The polish may further include a crosslinking agent selected from the group consisting of aliphatic amines, cycloaliphatic amines, aromatic amines, carboxylic acids and mixtures thereof.

Films formed when compositions containing the present combinations of benzoate esters are applied to surfaces of wood and stone floors or the polyvinyl chloride wear layer of a composite flooring material exhibit film leveling and gloss comparable to prior art phosphate-containing compositions. These properties are typically superior to those achieved using one or both of the constituent benzoic acid esters types (alkyl and glycol) alone at the same concentration as the combined esters.

The present combinations of benzoic acid esters are also effective plasticizers for adhesives, and both pigmented and non-pigmented coatings. These types of compositions are described in detail in the aforementioned U.S. Pat. No. 6,689,830, the relevant portions of which are hereby incorporated by reference.

The following example demonstrates the unique combination of desirable properties imparted to a typical floor polish composition by the ester combinations of the present invention. This examples should not be interpreted as limitations on the scope of the present invention as defined in the accompanying claims. All parts and percentages in the example are by weight unless otherwise specified.

EXAMPLES

Example 1

This example demonstrates that prior art organic phosphates typically used as leveling agents in aqueous floor polishes can be replaced by the ester combinations of this invention without sacrificing the leveling of the liquid polish and the gloss, water resistance, and hardness of the final coating while increasing the soil resistance of the coating relative to a coating produced using a phosphate-containing coating composition.

A conventional phosphate-containing floor polish composition evaluated as a control and referred to hereinafter as IC was prepared by blending the following ingredients to homogeneity:

33.5 parts of water 48.6 parts of an aqueous emulsion containing 38 weight percent of a styrene-modified acrylic copolymer available as Duraplus® 3 from the Rohm and Haas Company, Philadelphia, Pa., USA;

1.43 parts of 2,2,4-trimethyl-1,3-pentanediol monoisobutyrate as a coalescing agent 5.6 parts of diethylene glycol monomethyl ether as a coalescing agent;

3.52 parts of a 30 weight percent solution in ethanol of a modified styrene/acrylic resin available as Chemrez 30 from Chem Cor Corporation 3.29 parts of a 40 weight percent aqueous emulsion of a polyethylene wax available as Epolene® E-43N from Eastman Chemicals;

3.13 parts of tributoxyethyl phosphate as a leveling agent, and less than 0.1 percent each of (1) a biocide available as Kathon E from Rohm and Haas Corporation (2) a fluorinated polyether available as Fluorad® FC-120 as a wetting agent and (3) as a defoaming agent, a 30 weight percent aqueous solution of an anionic surfactant, available as Abex-18S.

A composition of the present invention, referred to hereinafter as 1, was prepared by replacing the combination of 3.13 parts of the tributoxyethyl phosphate and 1.43 parts of 2,2,4-trimethyl-1,3-pentanediol diisobutyrate in IC with an equal weight (4.56 parts) of a mixture containing 17 weight percent of 2-ethylhexyl benzoate (2-EHB), 62 weight percent of diethylene glycol dibenzoate DEGDB) and 21 weight percent of diethylene glycol monobenzoate (DEGMB).

Three compositions (IIC, IIIC and IVC) containing prior art combinations of benzoic acid esters were prepared for comparative purposes to demonstrate the unique combination of desirable properties imparted by the present benzoic acid ester compositions to floor polishes.

In control composition, IIC, the combination of prior art phosphate and monoisobutyrate were replaced with an equal weight (4.56 parts) of the combination of benzoic acid esters referred to as composition III in the aforementioned U.S. Pat. No. 6,689,830, namely equal parts by weight of a) 2-ethylhexyl benzoate and b) a mixture containing diethylene glycol dibenzoate and triethylene glycol dibenzoate in a weight ratio of 2:1. The combination of DEGDB, TEGDB and DPGDB contained a total of less than 2.4 percent of the corresponding monobenzoates.

In control composition IIIC the benzoate mixture of IIC was replaced with 4.56 parts of a blend containing 60.8 weight percent of DEGDB, 17.8 weight percent of triethylene glycol dibenzoate (TEGDB) and 21.4 weight percent of dipropylene glycol dibenzoate. The mixture contained less than 2.4 weight percent of the corresponding monobenzoates.

In control composition IVC the benzoate mixture of IIIC was replaced with 4.56 parts of DEGDB containing 40 weight percent of the corresponding monobenzoate.

All of the polish compositions evaluated were prepared by blending all ingredients for 30 minutes using a Cowles type mixer rotating at a speed of 500 RPM.

The following test procedures were used to evaluate the polish compositions of the present invention and the two prior art compositions containing an organic phosphate as the leveling agent.

Leveling

Six layers of the composition to be evaluated were applied to a black vinyl floor tile using a 2×2 inch (5 by 5 cm) gauze pad at a concentration of 4 ml per square foot. Each dried coating was rated subjectively on a scale of from poor (1) to excellent (5). The results of the evaluation are recorded in the following Table I.

TABLE I

| Composition | Leveling Rating After n Coats n = | | | | | |
|---|---|---|---|---|---|---|
| | 1 | 2 | 3 | 4 | 5 | 6 |
| I | 1 | 4 | 4 | 5 | 4 | 4 |
| IC | 4 | 5 | 5 | 5 | 5 | 4 |
| IIC | 0 | 3 | 3 | 4 | 4 | 3 |
| IIIC | 0 | 0 | 0 | 0 | 0 | 0 |
| IVC | 0 | 3 | 3 | 3 | 4 | 4 |

The foregoing data demonstrate that formulation I of the present invention exhibited leveling nearly as good as the prior art phosphate in composition IC and superior to the other controls. Control IIC, containing the same blend of benzoic acid esters identified as composition III in example 1 of U.S. Pat. No. 6,689,830, exhibited lower leveling ratings in this evaluation.

Gloss Development

Gloss development was determined using ASTM test procedure D 1455-87.

Six coats of the five formulations described in the preceding section of this example were applied to the finished surface of a black floor tile at a rate of 4 ml. per ft.$^2$ (43 ml. per m.$^2$) on to a black polyvinyl chloride floor tile using a gauze pad. Each layer of polish was allowed to dry under ambient conditions for 40 minutes prior to being evaluated for gloss development, following which the next layer was applied.

Gloss development was measured at an angle of 20° using a Micro-Tri Glossimeter manufactured by BYK Gardner Corporation.

The results of this evaluation are recorded in the following table II using a scale wherein 0 represents minimum gloss.

TABLE II

| Composition | Gloss Development Following n Coats n = | | | | |
|---|---|---|---|---|---|
| | 2 | 3 | 4 | 5 | 6 |
| I | 15.20 | 36.8 | 60.73 | 75.7 | 63.67 |
| IC | 11.30 | 28.67 | 51.97 | 73.87 | 61.80 |
| IIC | 7.60 | 18.47 | 38.33 | 50.73 | 44.90 |

TABLE II-continued

| Composition | Gloss Development Following n Coats n = | | | | |
|---|---|---|---|---|---|
| | 2 | 3 | 4 | 5 | 6 |
| IIIC | 1.23 | 1.17 | 1.47 | 1.10 | 1.00 |
| IVC | 10.93 | 34.87 | 65.40 | 74.04 | 62.43 |

The data in Table II demonstrate that the gloss imparted by a benzoate blend of the present invention was slightly better than the gloss imparted by composition IC containing the prior art phosphate and comparable in performance to a polish composition containing a blend of the mono and dibenzoates of diethylene glycol without any 2-ethylhexyl benzoate.

The superior water resistance of a black floor tiles coated with a 6 layers of a polish containing a benzoate composition of this invention was demonstrated using ASTM test D 1793-92. The results of this evaluation are recorded in the following Table III

TABLE III

| Composition | Water Resistance |
|---|---|
| I | 5 |
| IC | 2 |
| IIC | 2 |
| IIIC | 1 |
| IIIC | 1 |
| IVC | 1 |

The resistance to soiling of a white vinyl floor tile coated with Composition I of the present invention and Composition IC containing tributoxyethyl phosphate was evaluated using ASTM Test Procedure D 3206-92. Lower vales indicate less soiling, which is directly related to discoloration of the tile, also referred to as delta E.

The tile coated with composition I exhibited a delta E value of 16.48 compared with a delta E value of 20.82 for Composition IC.

That which is claimed is:
1. A film-forming composition comprising
A) at least one polymer selected from the group comprising:
   (1) homopolymers and copolymers of esters of acrylic and methacrylic acids;
   (2) said copolymers wherein a portion of repeating units are derived from at least one acid selected from the group consisting of acrylic and methacrylic acids;
   (3) copolymers of styrene and at least one member selected from the group consisting of esters of acrylic and methacrylic acids; and
   (4) homopolymers and copolymers of vinyl acetate;
B) a mixture of from about 0.1 to about 40 weight percent, based on the weight of the film forming composition, of benzoic acid esters, the mixture of benzoic acid esters comprising:
   (1) from about 15 to about 20 weight percent, based on the total weight of the mixture of benzoic acid esters, of an ester having a formula PhCO(O)R$^1$, where Ph is a phenyl radical and R$^1$ is 2-ethylhexyl;
   (2) from about 60 to about 65 weight percent, based on the total weight of the mixture of benzoic acid esters, of diethylene glycol dibenzoate; and (3) from about 20 to about 25 weight percent, based on the total weight of the mixture of benzoic acid esters, of diethylene glycol monobenzoate.

2. The composition according to claim 1 wherein said mixture contains about 17 weight percent of PhCO(O)R$^1$, about 62 weight percent of diethylene glycol dibenzoate and about 21 weight percent of diethylene glycol monobenzoate.

3. The composition of claim 1 wherein said polymer is present in an aqueous medium.

4. The composition according to claim 1 wherein said polymer includes at least one polymer from the group comprising
(1) homopolymers and copolymers of esters of acrylic and methacrylic acids wherein the alcohol portion of said esters contains from 1 to 8 carbon atoms;
(2) said copolymers of (1) wherein a portion of the repeating units are derived from at least one acid selected from the group consisting of acrylic and methacrylic acids;
(3) copolymers of styrene and at least one member selected from the group consisting of esters of acrylic and methacrylic acids wherein an alcohol portion of said esters of acrylic and methacrylic acid include from 1 to 8 carbon atoms, and repeating units derived from styrene, wherein the repeating unit derived from styrene include from about 0.1 to about 15 weight percent of the repeating units present in said copolymers; and
(4) copolymers of (3) wherein a portion of the repeating units are derived from at least one acid selected from the group consisting of acrylic and methacrylic acids.

5. The composition according to claim 3 wherein said aqueous medium is about 10 to about 95 weight percent of said film forming composition.

6. The composition of claim 1 wherein the composition is a polish, adhesive, ink or coating.

7. The composition according to claim 5 wherein said composition is a liquid at 25° C.

8. A polish composition for flooring surfaces formed from wood, stone and vinyl polymers, wherein films applied using said composition have a combination of hardness, leveling, high gloss, and recoatability in combination with resistance to soiling and spotting by water, and wherein said composition comprises:
A) at least one polymer selected from the group comprising:
(1) homopolymers and copolymers of esters of acrylic and methacrylic acids;
(2) said copolymers wherein a portion of repeating units are derived from at least one acid selected from the group consisting of acrylic and methacrylic acids;
(3) copolymers of styrene and at least one member selected from the group consisting of esters of acrylic and methacrylic acids;
B) a mixture of from about 0.1 to about 40 weight percent, based on the weight of the composition, of benzoic acid esters comprising
(1) from about 15 to about 20 weight percent, based on the total weight of the mixture of benzoic acid esters, of an ester having a formula PhCO(O)R$^1$, where Ph is a phenyl radical and R$^1$ is 2-ethylhexyl;
(2) from about 60 to about 65 weight percent, based on the total weight of the mixture of benzoic acid esters, of diethylene glycol dibenzoate, and
(3) from about 20 to about 25 weight percent, based on the total weight of the mixture of benzoic acid esters, of diethylene glycol monobenzoate.

9. The composition according to claim 8 where said mixture contains about 17 weight percent of said ester, about 62 weight percent of diethylene glycol dibenzoate and about 21 weight percent of diethylene glycol monobenzoate.

10. The composition of claim 8 wherein said polymer is present in an aqueous medium.

11. The composition according to claim 10 wherein said aqueous medium is about 10 to about 95 weight percent of said composition.

12. The composition according to claim 11 wherein said composition is a liquid at 25° C.

13. The composition according to claim 12 wherein said composition further comprises an emulsified polyolefin wax, a coalescent for said polymer, a rosin-based resin, and said benzoic acid ester as a leveling aid.

14. The composition according to claim 13 wherein the concentration of the aqueous polymer is from about 10 to about 70 weight percent, the concentration of said coalescent is from about 1 to about 10 weight percent, the concentration of said emulsified polyolefin wax is from about 1 to about 30 weight percent, the concentration of said rosin-based resin is from about 1 to about 10 weight percent, and said composition additionally comprises from about 30 to about 80 weight percent of water.

15. The composition according to claim 14 wherein said coalescent is selected from the group consisting of etherified glycols and said polyolefin wax is a polyethylene wax.

16. The composition according to claim 15 wherein said composition contains less than one weight percent of at least one additive selected from the group consisting of biocidal agents, wetting agents, defoamers and mixtures thereof.

17. The composition according to claim 1 in the form of an adhesive comprising from about 50 to about 95 weight percent of an emulsified polymer selected from the group consisting of polyvinyl acetate and copolymers of vinyl acetate and ethylene.

18. The composition according to claim 1 wherein said polymer is selected from the group consisting of aliphatic, cycloaliphatic and aromatic diepoxides.

19. The composition according to claim 13 wherein said composition further comprises a crosslinking agent.

20. The composition according to claim 19 wherein said crosslinking agent is selected from the group consisting of aliphatic amines, cycloaliphatic amines, aromatic amines and carboxylic acids.

21. An article coated with at least one layer of a polish composition of claim 8, wherein said article is selected from the group consisting of 1) bare and coated stone, and wood, 2) filled and unfilled organic polymers and 3) coated metal.

22. A method of making a film forming composition comprising blending a polymer with a mixture of from about 0.1 to about 40 weight percent, based on the weight of the composition, of benzoic acid esters,
wherein the polymer includes at least one polymer from the group comprising homopolymers and copolymers of esters of acrylic and methacrylic acids; copolymers having a portion of repeating units derived from at least one acid selected from the group consisting of acrylic and methacrylic acids; copolymers of styrene and at least one member by selected from the group consisting of esters of acrylic and methacrylic acids; and homopolymers and copolymers of vinyl acetate,
wherein the mixture of benzoic acid esters comprising from about 15 to about 20 weight percent, based on the total weight of the mixture of benzoic acid esters, of an ester having the formula PhCO(O)R$^1$, where Ph is a phenyl radical and R$^1$ is 2-ethylhexyl; from about 60 to about 65 weight percent, based on the total weight of the mixture of benzoic acid esters, of diethylene glycol dibenzoate, and from about 20 to about 25 weight percent, based on the total weight of the mixture of benzoic acid esters, of diethylene glycol monobenzoate.

23. The method of claim 22 wherein said mixture contains about 17 weight percent of $PhCO(O)R^1$, about 62 weight percent of diethylene glycol dibenzoate and about 21 weight percent of diethylene glycol monobenzoate.

24. The method of claim 22 wherein polymer is present in an aqueous medium.

* * * * *